INVENTORS
TOBIAS H. GRETHER
ROBERT M. ZIEGENMEYER
BY JAMES BERMANN
Harold R. Beck
ATTORNEY

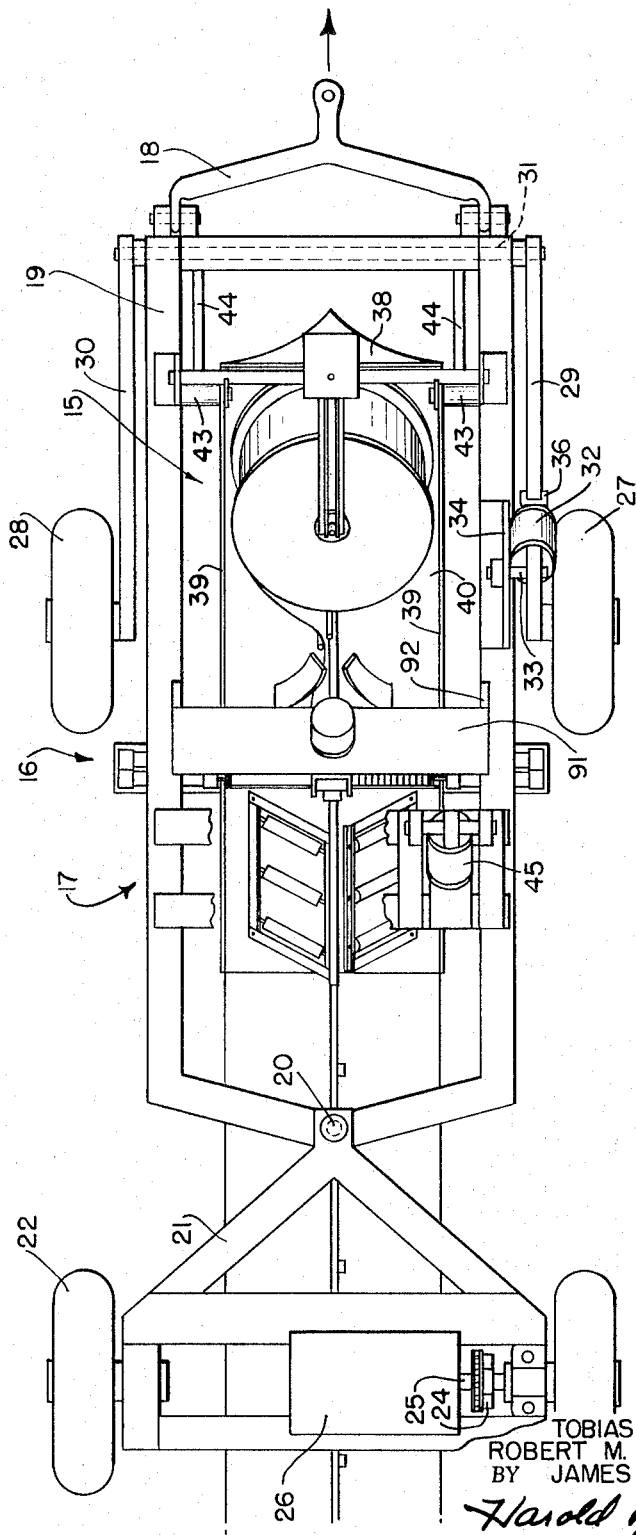

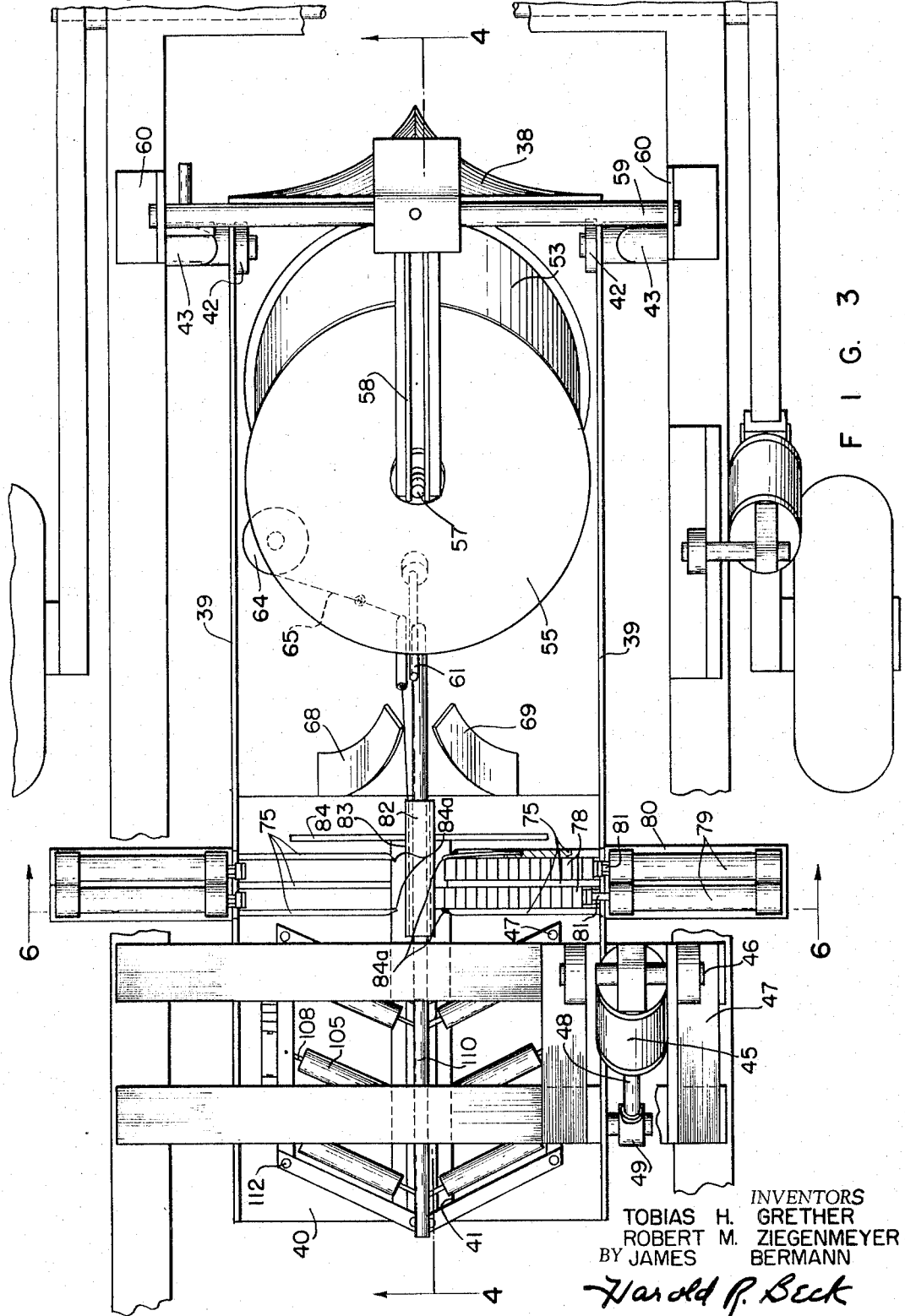

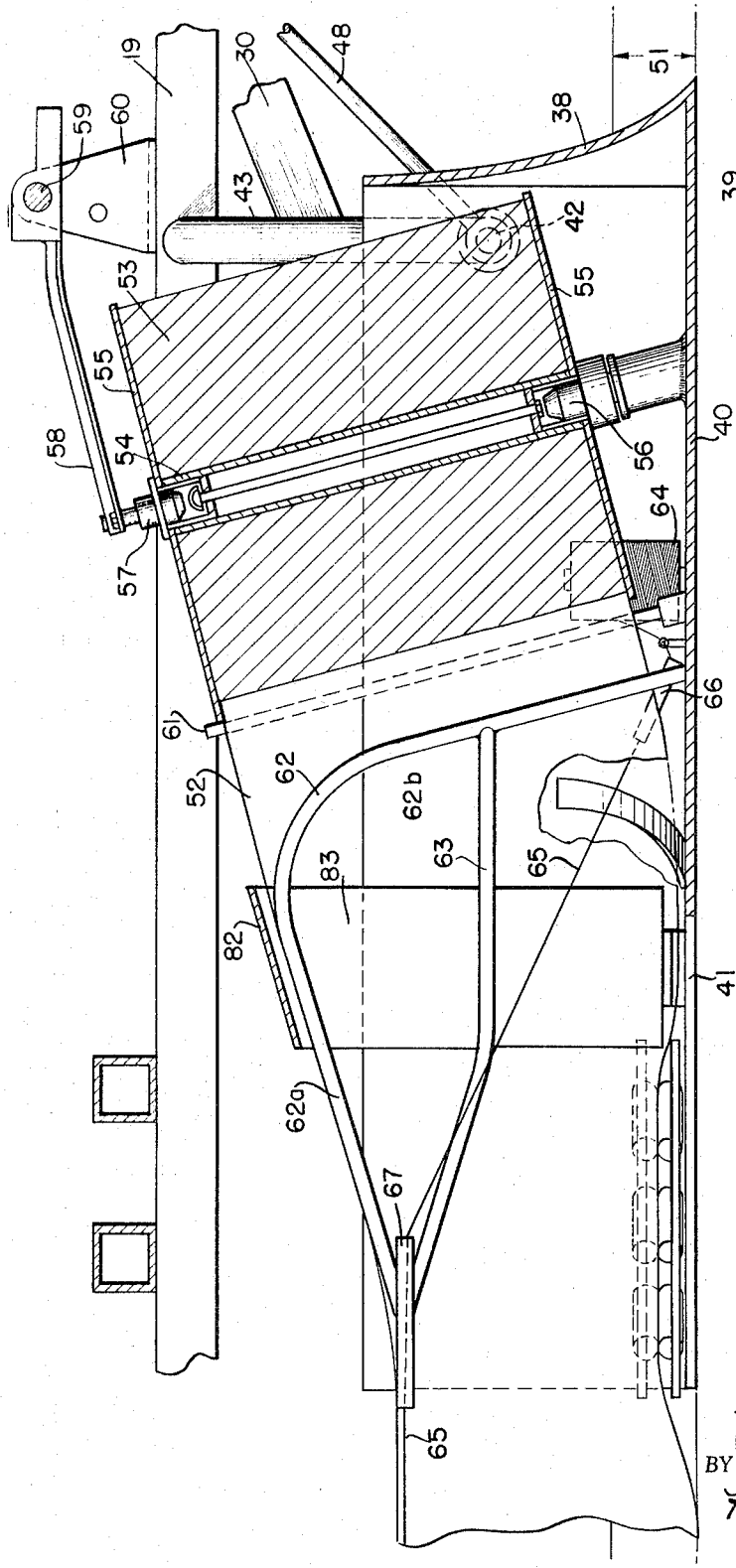

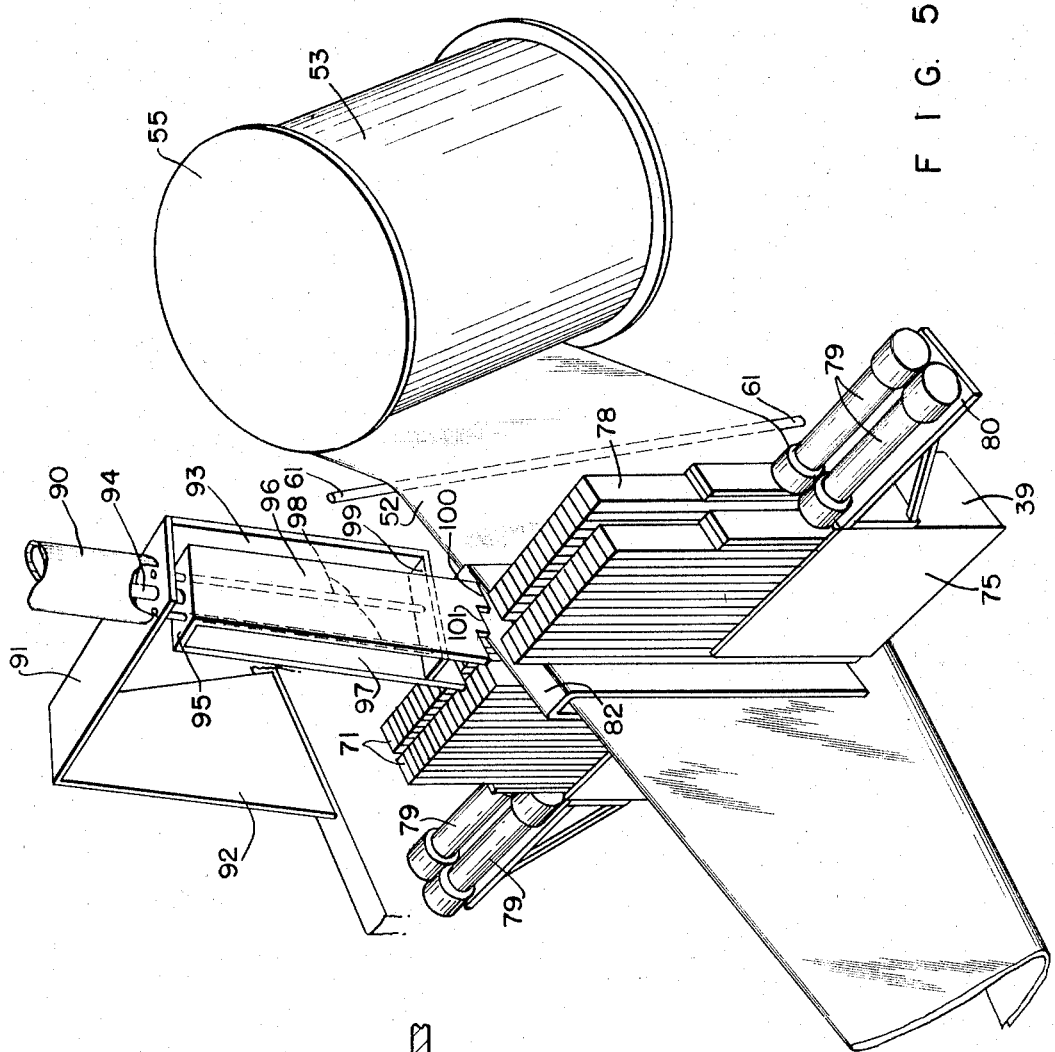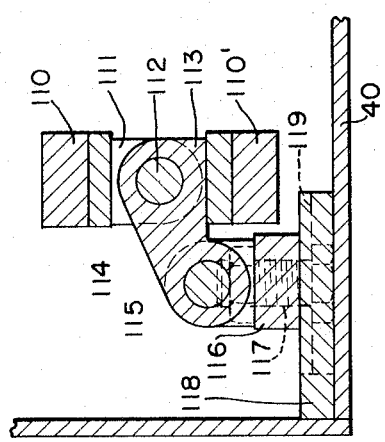

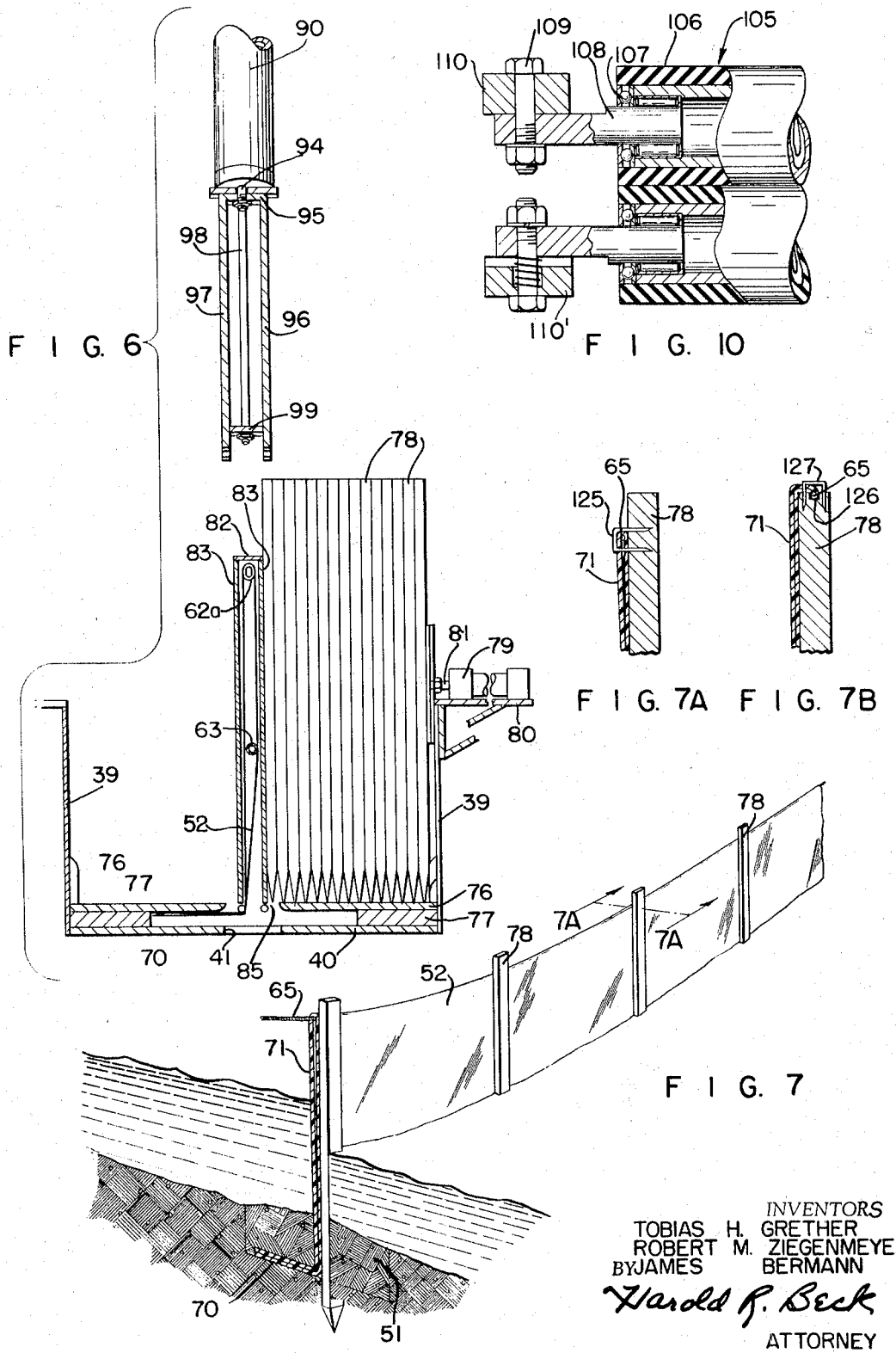

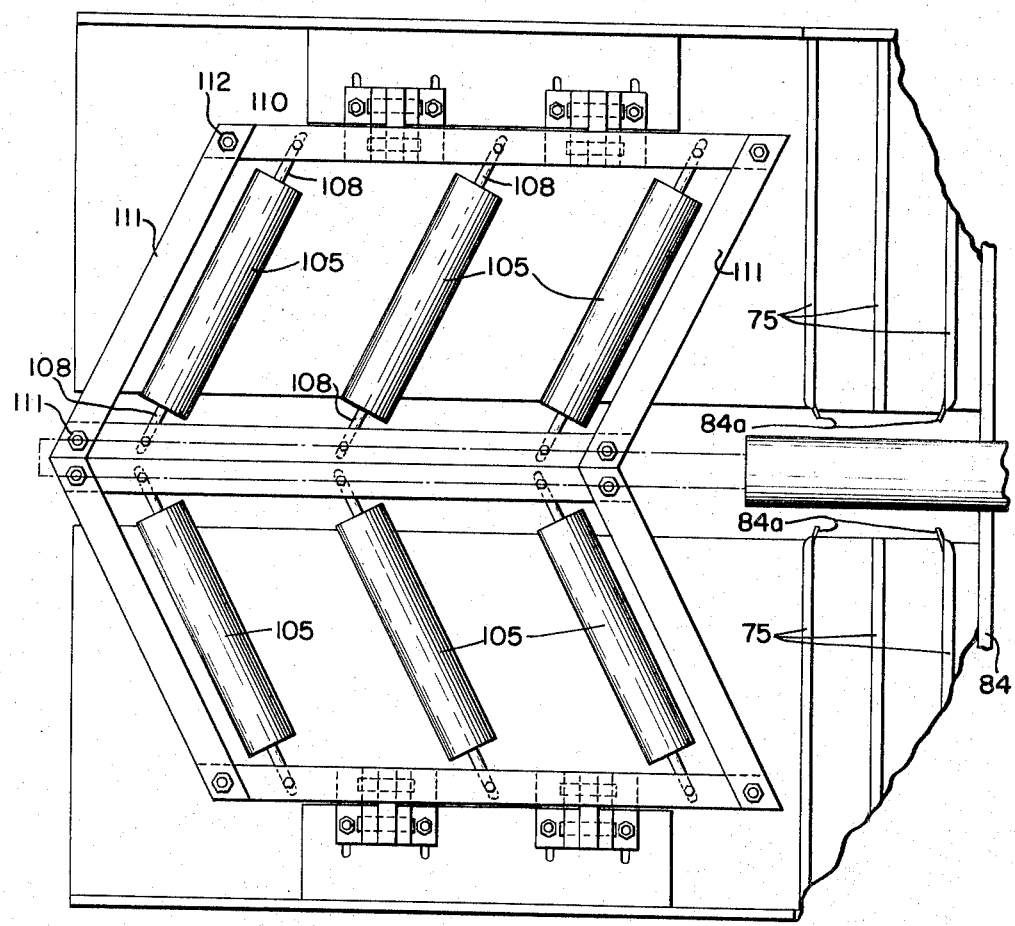
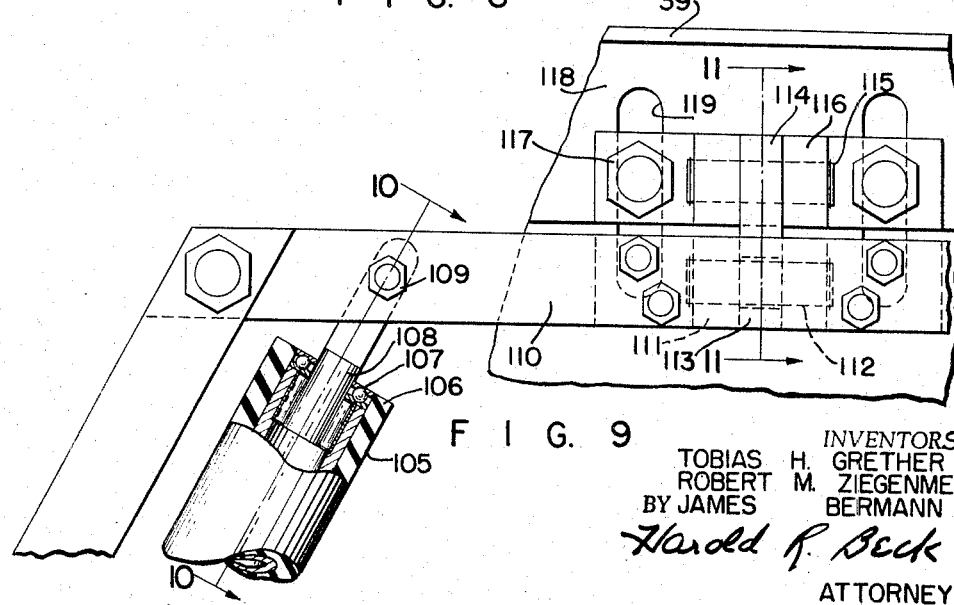

United States Patent Office 3,298,183
Patented Jan. 17, 1967

3,298,183
APPARATUS FOR ERECTING A FLUID BARRIER
Tobias H. Grether, Camarillo, Robert M. Ziegenmeyer, Sutter, and James Bermann, Oxnard, Calif., assignors to Consolidated Thermoplastics Company, Los Angeles, Calif., a corporation of California
Filed May 11, 1964, Ser. No. 366,467
6 Claims. (Cl. 61—72.1)

This application is an improvement on U.S. Patents Nos. 3,218,810 and 3,182,459, the subject matter of these prior patents being incorporated herein by reference.

The present application is directed to a fluid barrier and methods and apparatuses for erecting the fluid barrier. Such fluid barriers are useful for impounding or channelizing water. A typical application of this barrier is in a rice growing field wherein the barrier can be erected about the periphery of the field and crosswise thereof to establish various levels of water impounded at the established terrace levels. The presently used earthen dikes or levees have many disadvantages, as discussed in the above mentioned patent applications, and the barrier of the present invention overcomes these disadvantages.

The barrier according to the present invention is constructed to provided an economical and functional unit which may be simply and easily erected along or removed from a desired path. A rapid and economical removal of the barrier is important in rice growing usage since harvesting equipment must be free to move rapidly over unobstructed rice fields.

Specifically the barrier according to the present invention includes a plurality of rigid uprights disposed vertically within the earth with a substantial portion of each upright extending above the earth; the uprights are spaced from each other along a desired path, and a substantially fluid impervious flexible sheet is attached to and extends between the uprights with a portion of the sheet being disposed vertically and a continuous lower portion being bent over so that the sheet is L-shaped with the lower portion disposed within the earth along the desired path. Ideally the flexible sheet is fabricated from a polyolefin such as polyethylene or polypropylene.

A method according to the present invention is directed to a procedure for positioning a continuous sheet vertically with the lower edge located below the normal earth surface, and includes the steps of digging a continuous trench in the earth along a desired path; supplying a continuous, substantially water impervious, flexible sheet along the path; continuously folding the sheet to an L-shape having a vertical leg and a horizontal leg; positioning the horizontal leg in the trench, and maintaining the vertical leg in a supported position above the trench. Preferably the vertical leg of the sheet is supported by affixation to a plurality of rigid supports located at spaced intervals along the desired path.

An apparatus according to the present invention is directed to a mechanism for positioning a continuous sheet vertically with its lower edge located below the normal earth surface, and includes: means to penetrate the earth's surface to provide a continuous trench therein, and means to position the continuous sheet vertically with its lower edge located in the trench. Preferably the sheet is folded in an L-shape to provide a vertical leg and a horizontal leg. This folding is accomplished by means on the apparatus which continuously folds the continuous sheet to an L-shape and deposits the horizontal leg of the sheet wholly within the trench. The apparatus also includes power operated means to drive rigid supports vertically into the earth at spaced positions along a desired path so that the vertical leg of the sheet may be attached to the supports to maintain the vertical leg in a vertical disposed position to form a fluid barrier.

The apparatus according to this invention also includes power means to quickly raise and lower the trench digging mechanism and film depositing mechanism above and below the earth's surface. This feature of the present invention is important since the water barrier must extend to the edge of the rice fields and the like, and it is desirable to minimize the hand labor necessary for erecting small segments of the barrier adjacent the edges of the field. Thus the ability to erect the barrier as close to the edges of the fields as possible is achieved by the present invention, thereby minimizing hand labor.

The apparatus according to the present invention also includes a driving head for driving rigid stakes (preferably wooden) into the ground and this driving head is constructed and arranged to compensate for the forward movement of the apparatus during the driving operation.

The drawings illustrate a present preferred embodiment of the invention in which:

FIGURE 2 is a top plan view thereof, with parts broken away for clarity;

FIGURE 3 is an enlarged top plan view of a portion of the apparatus shown in FIGURE 2, with parts removed for clarity;

FIGURE 4 is a cross section taken on line 4—4 of FIGURE 3;

FIGURE 5 is a perspective of a portion of the apparatus including the sheet feeding mechanism and the stake driving mechanism;

FIGURE 6 is a cross section taken on line 6—6 of FIGURE 3;

FIGURE 7 is a perspective of a barrier in erected condition in a rice-growing field or the like;

FIGURE 7a is a cross section taken on line 7a—7a of FIGURE 7;

FIGURE 7b is a view similar to FIGURE 7a but showing a modified form of the barrier;

FIGURE 8 is an enlarged fragmentary view of the apparatus shown in FIGURE 2, with parts removed for clarity;

FIGURE 9 is an enlarged fragmentary view of the apparatus of FIGURE 8;

FIGURE 10 is a cross section taken on line 10—10 of FIGURE 9; and

FIGURE 11 is a cross section taken on line 11—11 of FIGURE 9.

Figure 1:
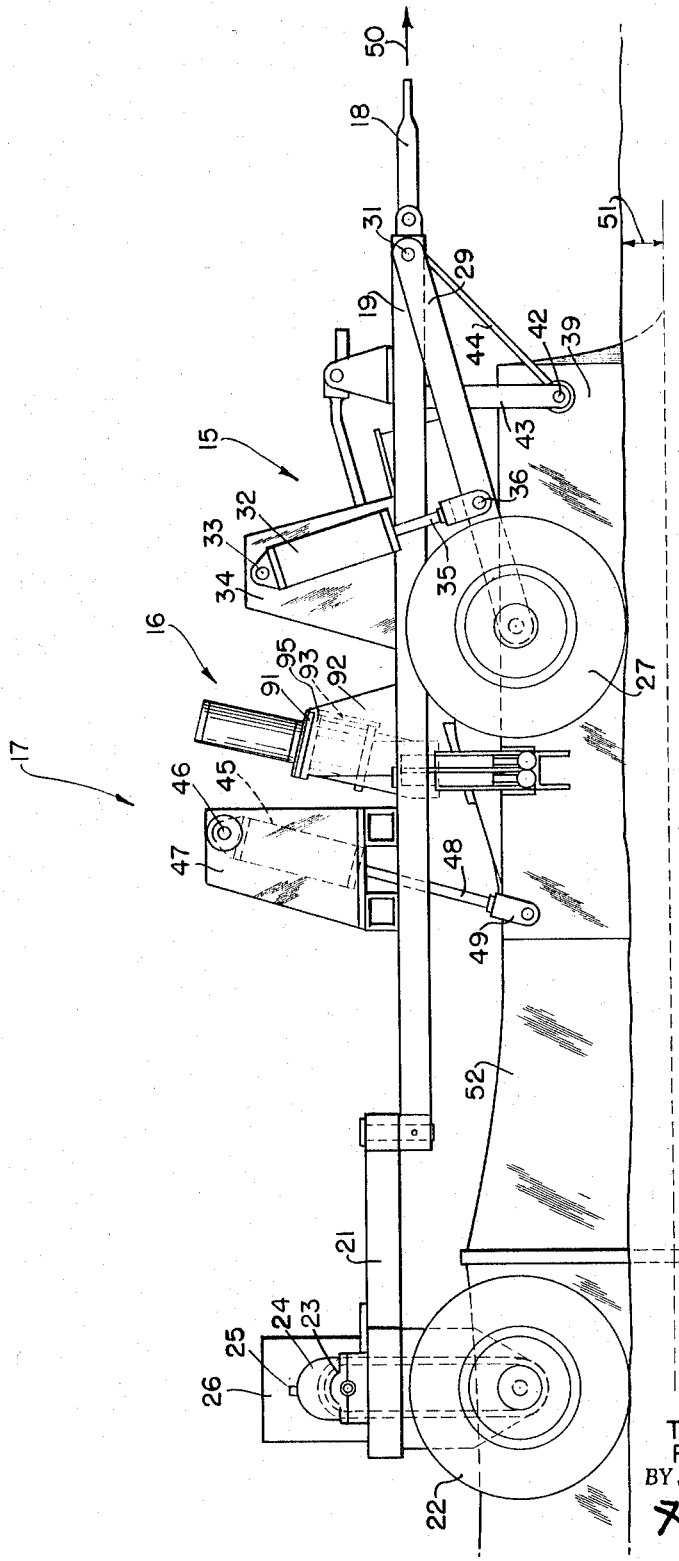
FIGURE 1 is a side elevation view of the apparatus according to the present invention.

Referring specifically to FIGURES 1 to 4, the apparatus according to the present invention includes a continuous sheet feeding section 15, a stake-driving section 16, and a film hold-down section 17.

The apparatus includes a vehicle, preferably mounted on wheels, which is pulled by a conventional tractor or the like (not shown) connected to a tow bar 18. Of course, an integral power unit for moving the vehicle over the desired path can be incorporated into the vehicle. The tow bar 18 is pivotally mounted to a rigid frame 19, generally of a rectangular shape and formed of box beam, providing the vehicle frame. The frame 19 is pivotally mounted at 20 to a Y-shaped rear frame 21 mounted on wheels 22. The pivotal mounting 20 permits sidewise, vertical or rotational movement of one frame relative to the other frame. The wheels 22 drive a sprocket 23 which in turn rotates an eccentric 24 to activate a trigger mechanism 25 to open and close a valve mechanism mounted in a housing 26. The valve mechanism operates the stake driving mechanism 16 as hereinafter described, and a predetermined rotation of wheels 22 and positioning of eccentric 24 insures proper spacing of the stakes. The housing 26 also contains suitable controls for various hydraulic cylinders to be described hereinafter. Various conventional hydraulic pumps, accumulators, drive motors, hydraulic hoses, etc., are provided on the apparatus but are not shown.

A pair of front wheels 27 and 28 are individually mounted for rotation on cantilever arms 29 and 30, respectively, on opposite sides of the main frame 19. The front end of each cantilever arm is integral with a shaft 31 mounted for free rotation in the front end of frame 19. The upper end of a hydraulic cylinder 32 is pivotally mounted at 33 on a mounting plate 34 affixed to the frame 19. A double-acting piston rod 35, mounted for reciprocation in cylinder 32, is pivotally mounted at 36 on the cantilever arm 29. Suitable hoses and valves connect the cylinder 32 to a source of pressurized hydraulic fluid. Upon introduction of pressurized fluid in the upper end of cylinder 32 the piston rod 35 is moved downwardly, thereby swinging the cantilever arm 29 about its pivot point formed by shaft 31 pivoting in its mounting in frame 19, to push the wheel 27 downwardly, thereby raising the front end of the frame 19. Simultaneously the shaft 31 transmits this swinging motion to the cantilever arm 30 on the opposite side of frame 19, and pushes the wheel 28 downwardly to evenly elevate the front of frame 19. This raising operation can be reversed by moving the piston rod 35 upwardly in the cylinder 32 (exhaust the hydraulic fluid from the upper end of cylinder 32), thereby lowering the frame 19 by retracting the wheels 27 and 28 upwardly.

A boat is located centrally of the frame 19 and includes a front plow portion 38, integral rearwardly extending side walls 39 and an integral bottom wall 40 having a rearwardly opening slot 41.

The boat is pivotally mounted at its front end at 42 to a pair of support bars 43 affixed to and extending downwardly from the underside of frame 19. The support bars 43 are suitably braced by rods 44. The boat is freely rotatable vertically about point 42.

A hydraulic cylinder 45 is pivotally mounted at its upper end to a rod 46 mounted between a pair of spaced mounting plates 47 affixed to the top side of frame 19. A piston rod 48 extends downwardly from cylinder 45 and is pivotally connected at its lower end 49 to one side wall 39 of the boat. Suitable hydraulic fluid controls and a supply of pressurized fluid is provided for the hydraulic cylinder 45 whereby the introduction of pressurized fluid in the upper end of cylinder 45 results in the piston rod 48 moving downwardly (FIGURE 1) thereby pushing downwardly on the rear end of the boat to pivot the boat about point 42; and conversely: the introduction of pressurized fluid into the lower end of cylinder 45, with appropriate exhaustion of fluid from the upper end of the cylinder, results in the piston rod 48 moving upwardly thereby elevating the rear end of the boat in a swinging motion about point 42.

As described hereinbefore, the wheels 27 and 28 function to raise and lower the front end of the boat by elevating the front portion of frame 19, and the piston rod 48 and cylinder 45 function to raise and lower the rear end of the boat. The wheels 27 and 28 are used to elevate the frame 19 so that the plow is elevated above the earth's surface when it is desired to move the apparatus along roads or the like. In using the present invention, it is essential to commence plowing a trench in the earth and erecting the barrier as soon as possible at the end of a field (such as a rice growing field) to avoid the use of hand labor; therefore the boat must be plunged into the earth quickly by activating the cylinder 45 to elevate the rod 48 and swing the rear end of the plow upwardly in a swinging movement about point 42. The front end of the plow 38 is pointed downward at this point. The apparatus is then pulled forward in the direction of arrow 50 so that the plow portion 38 may be immediately plunged into the earth by raising the wheels 27 and 28 thereby lowering the front end of frame 19. Thus the front face 38 of the plow is plunged into the earth to immediately establish the depth of the trench 51 and by proper manipulation of the fluid introduced into the cylinder 45, the rod 48 may be moved downwardly to swing the rear end of the boat about pivot point 42 until the boat is in the horizontal position as shown in FIGURE 1. In FIGURE 1 the apparatus is in barrier erecting position and further movement in the direction of arrow 50 will result in the continuous erection of the barrier 52.

A spool of plastic film 53, provided with a core 54 and a circular end plate 55, is mounted toward the front of the boat on a core mounting spindle 56 welded to the bottom plate 40 of the plow. The upper end of the core 54 receives an upper mounting spindle 57—the upper end of which is rotatably attached to a hold-down arm 58 which is pivoted on a shaft 59 swingably mounted in brackets 60 affixed to the frame 19. Thus the spindle 57 may be swung upwardly from its position shown in FIGURE 4 to an elevated position for removing an empty core and inserting a new spool of plastic 53. The spool of plastic is rotatable about an axis defined by the spindles 56 and 57 which is about 15° from the vertical. The plastic film of the barrier 52, preferably in the form of a double sheet of plastic with its folded end upwardly, and its free edges downward, passes around a rod 61 and downwardly over an inverted L-shaped separating frame 62. One sheet of the plastic passes on each side of the frame as shown in FIGURE 6. The L-shaped separating frame has an inclined horizontal leg 62a and integral inclined vertical leg 62b welded, at its lower end, to the bottom plate 40 of the boat. A suitable supporting rod 63 separates and supports the two legs. A ball of twine or string 64 is rotatably mounted on a spindle and supplies a continuous string or cord 65 to a hollow direction tube 66 affixed to the lower end of the vertical leg 62a of the frame. The string 65 then passes upwardly through a hollow tube 67 mounted at the outer end of the leg 62a of the frame. The string 65 is deposited by tube 67 into the upper fold or crease of the plastic film 52 to provide a longitudinal support for the film between the stakes.

A pair of spaced deflector plates 68 and 69 are provided on the opposite sides of the frame 62 and welded to bottom plate 40 of the boat in the manner shown in FIGURES 3 and 4. The deflector plates 68 and 69 curve upwardly and inwardly and form part of the folding mechanism for folding the lower leg of the plastic film 52 outwardly to provide a horizontal leg 70 and a vertical leg 71 on the barrier as shown in FIGURES 6 and 7. The plastic film 52, while moving over the frame 62, is folded in either direction to permit the apparatus to traverse a desired path in either direction while depositing the film and insuring that the leg 70 is deposited on the high water side as shown in FIGURE 7. Thus the apparatus may move left-to-right or right-to-left in erecting the barrier shown in FIGURE 7.

After leaving the frame 62 the plastic sheet then passes through the stake driving station, as best shown in FIGURE 5. A stake feeding mechanism is provided on each transverse side of the boat and each mechanism includes three parallel plates 75 mounted vertically on the inside face of the side wall 39 of the boat and provided with a floor plate 76 affixed to wall 39 and (see FIGURE 6) spaced slightly above the bottom plate 40 of the boat by a spacer plate 77. The stakes 78 are disposed vertically between adjacent plates 75, as shown in FIGURES 5 and 6, with their pointed ends downwardly, to provide a single stake magazine. A hydraulic cylinder 79 is mounted outside each magazine on a rigid shelf 80, affixed to the outer face of the side wall 39 of the boat, and has a piston rod 81 extending inwardly of the boat between the plates 75 of the magazine. An integral pushing shoe is affixed to the inner end of the piston rod 81. Suitable controls and a supply of pressurized hydraulic fluid is provided for each of the cylinders 79 to activate the piston rod 81 inwardly and outwardly as desired. The controls permit the activation of only one hydraulic cylinder during the stake feeding cycle. The inner face of shoe 82 engages the outermost stake 78 and exerts a pressure to force the stakes in the magazine inwardly to the position shown in FIGURE 6. A U-shaped protector plate having a top wall 82 and side walls 83 is mounted to the floor plate 40 of the boat by gusset plates 84. Upon inward movement of the piston rod 81 the innermost stake is pushed against the outer face of plate 83 and disposes the innermost stake immediately above an opening 85 provided between the innermost extremity of plate 76 and the vertical plate 83. Likewise this innermost stake is disposed above the slot 41 in the bottom plate 40 of the boat. Therefore, the innermost stake can move vertically downwardly into engagement with the underlying earth. Each stake magazine has a pair of opposed springs 84a which engage the innermost stake to maintain the stakes in a vertical, outward position as shown in the right hand magazine of FIGURE 3.

The U-shaped protector plate provides protection for the film within the plate in the event that a stake is broken during the stake driving operation. Any perforation of the film, from a broken stake or the like, should be avoided to insure a fluid impervious barrier. Each of the hydraulic cylinders 79 are individually actuatable so that only one of the four cylinders is operable at any given time. Each side of the stake feeding mechanism is provided with two magazines to feed stakes to side-by-side positions beneath the driving head for driving the stakes into the earth. The magazines are provided on each side of the driving head to permit the driving of the stake 78 into the earth on either side of the film. The stake must be driven on the side of the film opposite to leg 70. Thus no matter which way the apparatus is traveling along a given path, the stakes may be driven on the low water side of the barrier by proper actuation of one or the other side of the battery of feed magazines. In each battery of two feed magazines, only one of the feed magazines is operable at any given time while the other feed magazine is being loaded by the operator. Thus one of the two feed magazines on each side is feeding stakes beneath the driving head while the other feed magazine is held in readiness for operation as soon as the stakes in the other magazine have been exhausted.

As shown in FIGURE 6, the horizontal leg 70 of the plastic film 52, after being folded over by the deflector plate 68 moves through a U-shaped channel formed by the bottom plate of the boat 40, the spacer plate 77 and the plate 76. A U-shaped channel is provided under each feed mechanism.

The stake driving mechanism includes a hydraulic cylinder 90 mounted on a transversely extending support plate 91 mounted on elevation plates 92 affixed to frame 19. The cylinder has a downwardly extending piston rod 94 which passes through support plate 91 and is integral at its lower end with a horizontal head plate 95 having a pair of integral, spaced driving head plates 96 and 97 depending downwardly therefrom at each of the transverse edges of the plate 95. A back plate 93 is affixed to the front edge of and depends downwardly from the support plate 91. A secondary mounting plate 99 is integral with the lower edge of back plate 93 and extends inwardly between the driving head plates 96 and 97, and is substantially parallel to plates 91 and 95. A pair of spaced, parallel, guide rods 98 are integral at their upper end with the support plate 91 and at their lower end with the secondary mounting plate 99. Thus, as the piston rod 94 moves downwardly, after introduction of hydraulic fluid into the upper end of cylinder 90, the plate 95 slides on the rods 98 (conventional bushings are provided on plate 95 to slidably receive rods 98) downwardly, thereby moving the driving head plates 96 and 97 downwardly. The rods 98 function as guides for the driving head plate and insure repetitive vertical movement of the plates. The introduction of hydraulic fluid into the lower end of cylinder 90 reverses this operation and elevates the driving head plates 96 and 97 to the position shown in FIGURE 5.

The lower end of each driving head plate (96 and 97) has a stepped configuration to provide a first flat driver area 100 which is engageable with the top of the innermost stake in the front stake feeding magazine, and a second flat driver portion 101 engageable with the top of the innermost stake in the rear stake feeding magazine. Each of the driving head plates 96 and 97 are identical in construction and location.

The flat areas 100 and 101 are substantially parallel to the earth. The stepped configuration of the driving head plates is to permit the areas 100 and 101 to slide off the stake, after being driven, due to the forward movement of the apparatus.

The driving mechanism is disposed at an angle from the vertical which compensates for the forward movement of the vehicle in the direction of the arrow 50 during the time required for driving a single stake. The formula for the inclination of the driving mechanism is as follows:

sine $\theta = \frac{x}{y}$ wherein:

$\theta$ = the angle of inclination from the vertical of the driving head stroke;

$x = txs$, where:

$t$ = time in minutes to drive one stake; and
$s$ = forward speed of the driving mechanism (vehicle) in feet per minute;
$y$ = length of the driving stroke (feet).

During driving of a stake, the innermost face of the stake slides on the outer surface of plate 83 of the protector housing. This insures that the stake is driven vertically into the earth.

Located immediately to the rear of the stake driving mechanism is the hold-down section 17. It is desirable to hold the leg 70 of the plastic film in its folded position just prior to its deposition into the trench dug by the boat. This is accomplished by two sets of rollers 105 mounted within the boat. The sets are identical in construction and thus only one will be described herein.

The rollers 105 have a rubber surface 106 mounted on a rigid core and bearings 107 encompassing end shafts 108 to permit free rotation of each roller about shafts 108. The outer ends of each shaft 108 are pivotally mounted by nuts and bolts 109 to spaced, parallel side braces 110 of a parallelogram frame formed by the side braces 110 and end braces 111. The corner juncture points of the braces 110 and 111 provide pivotal unions at 112 but these pivots are formed by nuts and bolts which may be locked tightly to lock the braces 110 and 111 in a desired parallelogram such as shown in FIGURE 8. Thus, the parallelogram frames may be disposed in any parallelogram configuration so that the rollers 105 are rotatable on axes 108 forming an acute angle with the central path along which the film passes from front to rear of the apparatus. It is frequently desirable to vary the angle of the rollers to increase or decrease the outward pull on the leg 70 of the film.

Referring to FIGURES 10 and 11, it will be noted that identical parallelogram frames are provided in spaced positions from and immediately above each other. The upper frame is pivotally mounted to the lower frame (110′) by a clevis 111 which is swingably mounted on an axle 112 which passes through a second clevis 113 mounted integral with the top side of the lower frame 110 at two spaced locations along its length. The clevis 113 also has an outwardly extending arm 114 which is pivotally mounted by an axle 115 to another clevis 116 mounted by bolts 117 to a plate 118 secured to the bottom plate of the boat 40. Suitable slots 119 are provided in the plate 118 to permit transverse adjustment of the clevis 116 and corresponding adjustment of the entire hold-down unit.

The top parallelogram frame pivots vertically relative to the bottom frame for the purpose of admitting the leg 70 of the plastic film during admission of the plastic film through the machine during start-up operations. Likewise, the parallelogram frames and rollers may be swung upwardly and locked in a side position by suitable locks (not shown) to move one of the hold-down units out of the way while the other side frame is being used to hold down the film. FIGURES 3 and 8 illustrate the hold-down frames in the down position for clarity.

Referring to FIGURES 7, 7a and 7b, it may be appreciated that once the stakes 78 have been erected and the vertical leg 71 of the film is positioned next to the stake, it is desirable to attach the film (and preferably the string 65) to each of the individual stakes. FIGURE 7 shows a staple 125 driven into the stake 78 and enveloping the string 65 inside the upper folded end of the vertical leg 71. The staple 125 may be automatically driven into the stake at a position immediately following the stake driving operation or it may be hand stapled by an operator sitting to the rear of the boat. FIGURE 7b shows a modified form for attaching the vertical leg 71 of the film to the stake 78. The stake 78 has a slot in its upper end 126 and a staple 127 is driven around the string 65 and through the film after the string and film have been inserted into the slot 126. This modified arrangement may also be automatically or manually performed.

Suitable back fill deflector plates (not shown) are provided on the apparatus to return the plowed earth to the trench over the leg 70 of the barrier (see FIGURE 7). The deflector plates are of conventional construction and design, and adjustably mounted on the apparatus to permit variation in the quantity of back fill earth returned to the trench 51.

In the preferred embodiment of the present invention: the stakes are about 30" long, fabricated from wood with pointed bottom ends, and are embedded about 10" in the earth; the film is about 30"–36" long in the folded condition with the horizontal leg being about 10" long, and the trench is about 4"–6" deep.

While I have described the present preferred embodiment of my invention, it may be otherwise embodied within the scope of the following claims:

We claim:
1. Apparatus for erecting barriers comprising:
 (a) a wheeled vehicle movable along the earth in the path of the desired barrier;
 (b) a plow mechanism mounted on the vehicle and engageable with the earth surface to dig a continuous trench therein along said path;
 (c) a feed mechanism mounted on the vehicle to supply a vertically disposed continuous, flat, flexible sheet behind the plow mechanism, said sheet having an upper extremity and a lower extremity;
 (d) a folding mechanism mounted on the vehicle behind the feed mechanism to fold the sheet in an L-shape with one leg of the L disposed vertically and the other leg of the L disposed horizontally;
 (e) a guide mechanism mounted on the vehicle to deposit the horizontal leg into said trench; and,
 (f) a driving mechanism mounted on the vehicle behind the feed mechanism to drive stakes vertically into the earth adjacent the vertical leg of the L-shaped sheet.

2. An apparatus according to claim 1 including:
 (a) a fastening mechanism operatively related behind the driving mechanism to fasten the vertical leg of the sheet to each stake.

3. An apparatus according to claim 1 including:
 (a) a positioning mechanism mounted on the vehicle transversely adjacent to said driving mechanism to supply and position a stake beneath the driving head preparatory to driving the stake vertically into the earth.

4. An apparatus according to claim 1 including:
 (a) power means mounted on the vehicle to move all of said mechanisms vertically relative to the earth.

5. An apparatus for erecting water barriers along peripheral paths of a selected area, each barrier being a vertically disposed continuous flexible sheet having its lower edge embedded in the earth along the peripheral path and fastened to spaced, vertically disposed stakes embedded in the earth adjacent the sheet, comprising:
 (a) a vehicle having a frame and wheels to move the frame over the earth along the peripheral paths;
 (b) a plow mounted on the front of the frame and movable downward to penetrate the earth and dig a trench therein;
 (c) a spool of said sheet mounted to the rear of the plow to dispense a continuous sheet rearwardly of the plow as the vehicle moves forward along said path;
 (d) a deflector plate mounted to the rear of said spool to engage and fold the lower portion of said continuous sheet to form an L-shaped sheet;
 (e) a guiding member mounted to the rear of the deflector plate to direct said folded lower portion of the sheet into the trench;
 (f) a stake driving head mounted to the rear of the guiding member; and,
 (g) a power member mounted on the vehicle frame and adapted to actuate the stake driving head to embed spaced stakes vertically in the earth.

6. An apparatus according to claim 5 including:
 (a) a stake feeding magazine mounted on each side of the stake driving head;
 (b) a power member on each magazine to feed individual stakes to a position beneath the driving head preparatory to embedding the stake in the earth; and,
 (c) control means to inactivate the power member on one magazine when the power member on the other magazine is activated.

References Cited by the Examiner

UNITED STATES PATENTS

| 1,750,054 | 3/1930 | Rosso | 61—72.6 X |
|---|---|---|---|
| 2,314,045 | 3/1943 | Johnson | 61—72.6 |
| 2,333,287 | 11/1943 | Baird. | |
| 2,341,515 | 2/1944 | Rehfeld | 61—3 |
| 2,654,225 | 10/1953 | Saunders et al. | 61—29 |
| 2,663,515 | 12/1953 | Kinsinger | 61—72.6 X |
| 2,909,134 | 10/1959 | Kniefel | 61—72.6 |
| 3,134,233 | 5/1964 | Morrison | 61—12 |
| 3,182,459 | 5/1965 | Grether et al. | 61—63 |
| 3,218,810 | 11/1965 | Grether et al. | 61—12 |

FOREIGN PATENTS 93,022   11/1959   Netherlands.

CHARLES E. O'CONNELL, *Primary Examiner.*

EARL J. WITMER, *Examiner.*